(12) United States Patent
Williams et al.

(10) Patent No.: US 9,389,809 B2
(45) Date of Patent: Jul. 12, 2016

(54) STORAGE SYSTEM CONTROL USING A MULTI-PATH EXPANDER

(71) Applicant: Seagate Technology LLC, Cupertino, CA (US)

(72) Inventors: Timothy P. E. Williams, Wokingham (GB); David Michael Davis, Portsmouth (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/550,484

(22) Filed: Nov. 21, 2014

(65) Prior Publication Data

US 2015/0081970 A1    Mar. 19, 2015

Related U.S. Application Data

(63) Continuation of application No. 13/041,029, filed on Mar. 4, 2011, now Pat. No. 8,898,382.

(51) Int. Cl.
*G06F 12/00*    (2006.01)
*G06F 3/06*    (2006.01)
*G06F 13/00*    (2006.01)
*G06F 13/38*    (2006.01)

(52) U.S. Cl.
CPC ............ *G06F 3/0689* (2013.01); *G06F 3/0619* (2013.01); *G06F 3/0635* (2013.01); *G06F 3/0665* (2013.01); *G06F 12/00* (2013.01); *G06F 13/00* (2013.01); *G06F 13/385* (2013.01); *G06F 2213/0028* (2013.01)

(58) Field of Classification Search
None
See application file for complete search history.

(56) References Cited

U.S. PATENT DOCUMENTS

| | | |
|---|---|---|
| 2007/0093124 A1 | 4/2007 | Varney et al. |
| 2008/0005618 A1 | 1/2008 | Jones |
| 2011/0191637 A1 | 8/2011 | Wight et al. |

*Primary Examiner* — Midys Rojas
(74) *Attorney, Agent, or Firm* — Hall Estill Attorneys at Law

(57) ABSTRACT

Apparatus and method for controlling the storage of data in a multi-device storage system. In some embodiments, a storage system includes an expander coupled to a controller via multiple parallel data channel pathways, and a plurality of data storage devices coupled to the expander. The expander includes a control circuit adapted to selectively disable at least one but less than all of the multiple parallel data channel pathways.

20 Claims, 3 Drawing Sheets

STORAGE SYSTEM CONTROL USING A MULTI-PATH EXPANDER

RELATED APPLICATION

This application is a continuation of co-pending U.S. patent application Ser. No. 13/041,029 filed on Mar. 4, 2011 and which will issue as U.S. Pat. No. 8,898,382 on Nov. 25, 2014.

BACKGROUND

The present disclosure relates to a storage system and a method for control of a storage system. In particular, the disclosure relates to a method and apparatus for control of data flow within a storage system using a multi-path expander.

Typically, a data storage system that operates in accordance with existing data storage protocol will include plural storage media such as hard disk drives together with a controller arranged to communicate with a host central processing unit (CPU). The controller will be connected to (or will include) one or more expanders which effectively serve as multi-port switches to enable communication of data between the storage media and the host CPU.

Storage connections and protocols are continually evolving over time and thus the speed, capability and capacity of such protocols are similarly evolving. For example, one well known and utilised storage protocol is the Serial Attached SCSI (SAS) connection method and protocol which is common in storage systems. The standard includes specifications for channels and components within a system. Currently, each individual channel between a component within a SAS system is specified as needing to be at six Gigabits per second per lane. The previous revision of this specification, approximately one year ago, required only three Gigabits per second per lane and it is expected, in due course, that the next revision of the specification will require 12 Gigabits per second per lane.

FIG. 1 shows a schematic representation of a storage system. The system 2 includes a host CPU 4 connected to a controller 6, e.g. a SAS controller, which itself is connected to a SAS expander 8. It will of course be appreciated that a SAS expander is merely an expander that conforms to the SAS protocol. Similar storage systems might include corresponding components that operate in accordance with other storage protocols and the present disclosure is not therefore limited only to SAS systems.

Plural storage media 10 are provided which, in this case, might be hard disk drives. It is envisioned that any type of storage medium may be included. For example, in some cases solid state drives are provided as well as or instead of hard disk drives.

As can be seen, there are channels provided between each of the components in the system 2. In particular, there is a single channel between each of the storage media 10 and expander 8. There are plural channels provided between the expander and the controller. Also shown, but not of relevance to the present system is host memory 12.

The controller 6 is connected to the CPU 4 and the expander 8. The expander 8 is connected both to the controller 6 and to each of the storage media 10. In the example shown, there is only a single expander 8 provided. Twelve hard disk drives are provided with a four channel link between the expander and the controller.

In a system such as that of FIG. 1, using maximum data transfer and processing speed available today, the SAS bandwidth at the four channel link between the expander and the controller can provide is 2.4 Gigabits per second ($GiBs^{-1}$). This gives a maximum bandwidth of 200 Megabits per second ($MiBs^{-1}$) per disk drive which is sufficient for typical current data requirements. In addition, a typical controller is able to provide 300,000 input/output operations per second (IOPS) which again, split equally between the twelve disk drives gives approximately 50,000 IOPS per drive which is again, sufficient for today's capacities.

As mentioned above, it is envisaged that shortly twelve $GiBs^{-1}$ technology will be released and soon become industry standard. The same topology would therefore be capable of providing 400 $MiBs^{-1}$ and 83,000 IOPS per drive. Data rates at this sort of level are impressive and of great interest to the storage industry at large. Some issues arise. For example, a simple SAS topology created in the standard configuration shown in FIG. 1 using low cost parts is capable of providing bandwidth and data rates and IOPS that are far greater than would typically be required within a low end system. Furthermore, within a low cost system, the CPU 4 is likely to be a low cost device. When high numbers of IOPS are demanded of the CPU by the controller 6, significant capacity of a CPU is thus required to service the requests for the IOPS. Indeed, in some cases, the CPU can be utilised at 100% simply performing the IOPS.

SUMMARY

Various embodiments are generally directed to an apparatus and method for controlling the storage of data in a multi-device storage system.

In some embodiments, a storage system includes an expander coupled to a controller via multiple parallel data channel pathways, and a plurality of data storage devices coupled to the expander. The expander includes a control circuit adapted to is selectively disable at least one but less than all of the multiple parallel data channel pathways.

In other embodiments, a storage system includes a host processor, a controller coupled to the host processor, a plurality of storage devices, and a hub expander coupled between the storage devices and the controller. The expander is connected to the controller using N parallel data channel pathways, and includes an expander processor having associated programming to operationally disable between 1 and N−1 of the parallel data channel pathways between the expander and the controller responsive to an operational loading level of the host processor.

In other embodiments, a computer-implemented method includes transferring data between a plurality of storage devices and a controller by way of an intervening expander therebetween, the expander connected to the controller by way of multiple parallel pathways. An operational parameter associated with a host processor associated with the controller is monitored, and at least one and less than all of the multiple parallel pathways responsive to the monitored operational parameter.

BRIEF DESCRIPTION OF THE DRAWINGS

Embodiments of the present disclosure will now be described in detail with reference to the accompanying drawings, in which.

DETAILED DESCRIPTION

As explained above, in the present system, the bandwidth of the storage system is throttled artificially so as to reduce the MiBs$^{-1}$ bandwidth that each disk drive can achieve. Although counter intuitive, this provides several technical advantages.

First, by reducing the MiBs$^{-1}$ bandwidth of each disk drive, the overall system IOPS can be reduced or controlled to be within a certain level. By doing this, host CPU utilisation can be conserved or controlled so that it does not need to concentrate solely on performing the TOPS operations but instead can be used for running one or more storage applications, e.g. RAID or De-Dupe.

Furthermore, as will be explained below, due to the manner that the current method operates, it can be easily introduced into a system using control of the expander by, for example, a software function. In particular, typically a SAS expander includes an embedded processor on which software can be run. A software function can thus be used within the expander to control enablement of the SAS lanes or physical ports PHYs of the expander, and thereby throttle bandwidth of the storage system without the need for further or additional hardware.

Figure 1:
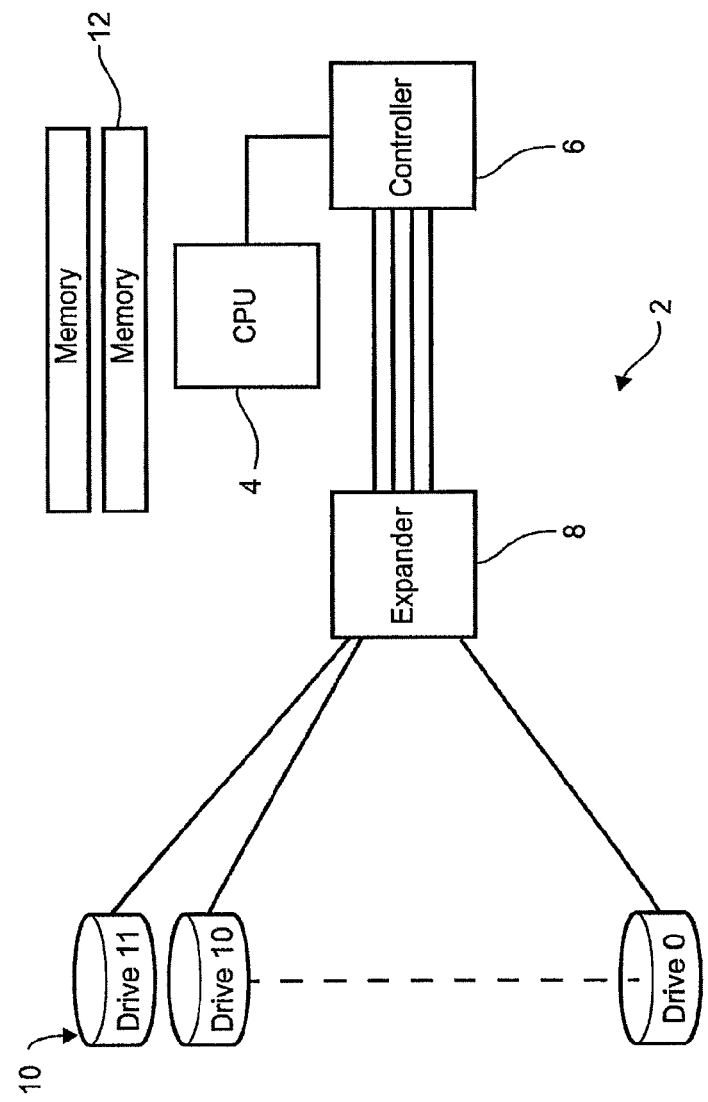
FIG. 1 is a schematic representation of a data storage system.
Figure 2:
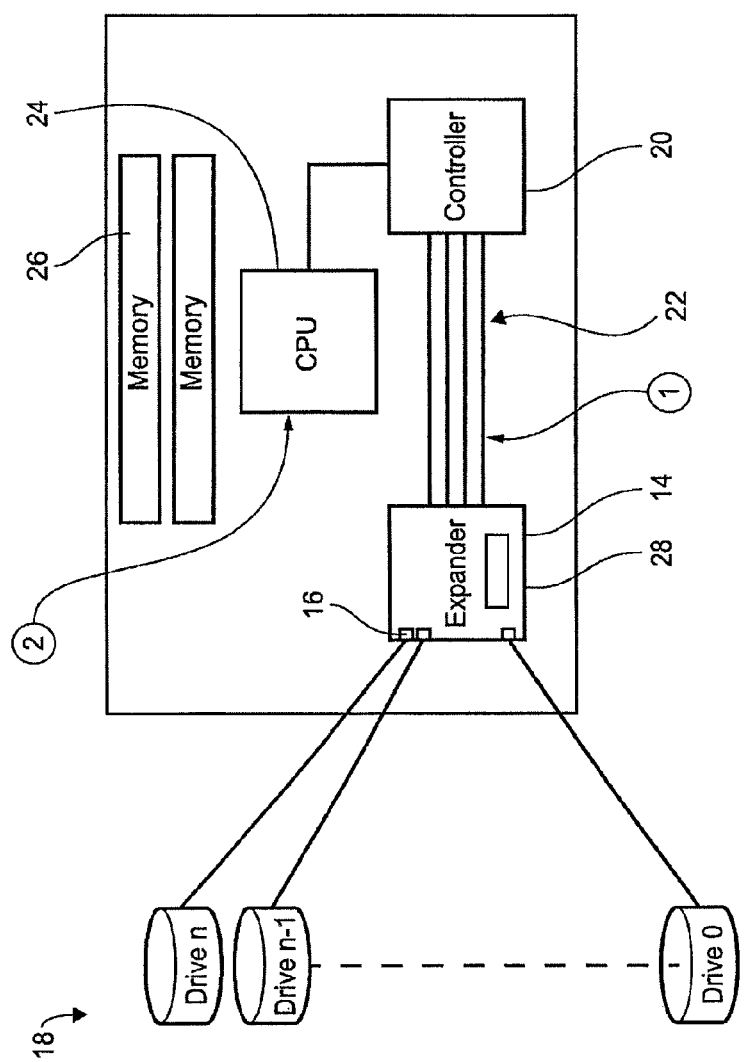
FIG. 2 is a schematic representation of a data storage system.

Referring now to FIG. 2, a storage system is provided including an expander 14. The expander 14 is connected via PHYs 16 to plural (n+1) storage media 18 labelled Drive 0 to Drive n, which in this case are hard disk drives. In addition, the expander 14 is connected to a controller 20 via plural channels 22. A host CPU 24 is provided together with host memory 26. The expander 14 includes its own embedded processor 28 which serves to run enclosure management software. In the present embodiment, the processor 28 is arranged to provide control of the SAS lanes 22 and in particular their enabled state. Thus, by software control executed via the processor 28, one or more of the lanes 22 can be disabled. This has the effect of limiting the bandwidth between the controller 20 and the expander 14 and therefore limiting the TOPS operations performed by the CPU 24.

As can be seen in FIG. 2, a reduction in the number of lanes 22 reduces both the bandwidth and the IOPS performance of the interconnect between the controller 20 and the expander 14. The restriction of this capability restricts the ability of the host CPU to process data as quickly and therefore throttles performance of the CPU. The host CPU is part of every transaction, and so small data movements give rise to high IOPS and high CPU loads. For large data movements the performance of the host CPU is not such a constraint and there are fewer transactions (per unit volume of transferred data), but the constrained bandwidth may still restrict the number of transactions that can be completed.

In addition, this functionality can be used to control the CPU temperature since if one or more of the lanes 22 are disabled then the number of IOPS that the CPU can perform will be reduced which will consequently reduce the temperature of the host CPU.

With SAS controllers and expanders that are typically available today, it can be demonstrated that reducing the number of lanes 22 down from 4 to 1, will limit the IOPS to a maximum of 50,000 which is about 4000 IOPS per disk drive in a twelve disk drive system. Similarly, the SAS bandwidth for communication between the disk drives and the controller is reduced to approximately 600 MiBs$^{-1}$ which equals approximately 50 MiBs$^{-1}$ per disk drive. For a low end CPU, this can reduce the CPU overhead from approximately 80% to approximately 12% when dealing with small block transfers. In other words, when there would be plural IOPS required for the transfer of any sizeable amount of data, by reducing the available bandwidth, the IOPS count can be significantly reduced thereby enabling the processor to perform other functions as well within its capacity or simply keeping down the temperature of the CPU.

Thus far, as described with FIG. 2, the method of disabling one or more data paths between an expander and controller has been described with reference to a simple storage system topology in which there is a single expander 14 connected to a single controller 20. However, in situations in which the storage system is more complex and a tree structure of expanders is provided, the method of disabling selected data paths between one or more expanders and a controller enables significant control capabilities to be provided such that it is possible to control the performance aspect of the system in an enhanced manner.

Figure 3:
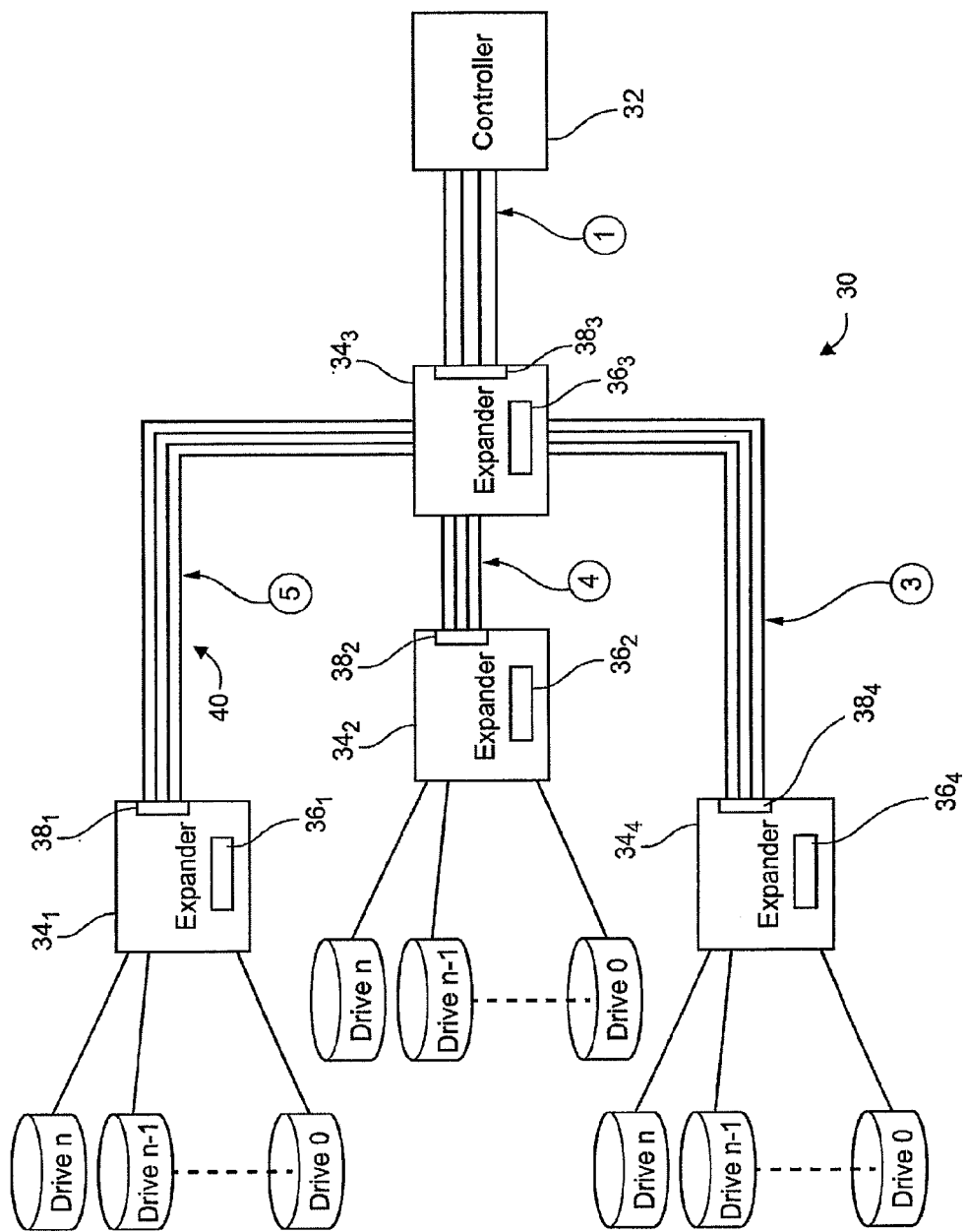
FIG. 3 is a schematic representation of a data storage system.

With reference to FIG. 3, an example of the system in which plural expanders are provided will now be described. Referring to FIG. 3, a storage system 30 is provided. The system includes a controller 32 connected to a host CPU (not shown). In this example, four expanders $34_1$ to $34_4$ are provided connected in a tree-like structure. It will be appreciated that what is significant is that there are plural expanders in a tree-like structure. The precise number in any example will depend on the configuration of the storage system and factors such as the number of disk drives and performance requirements of the system. Thus, the example of FIG. 3 is in no way limiting.

The first of the expanders $34_3$ is effectively a hub or root that connects the other three leaf expanders $34_1$, $34_2$ and $34_4$ to the controller 32. Plural data paths are provided between each of the peripheral expanders $34_1$, $34_2$ and $34_4$ and the hub expander $34_3$. In addition, plural channels are provided between the hub or root expander $34_3$ and the controller 32. Each of the expanders includes a corresponding embedded processor $36_1$ to $36_4$. The expander processors 36 are arranged to control operation of the respective expander and to selectively turn on or off one or more of the ports of PHYs on the respective expander. For example, for expander $34_1$, a processor $36_1$ is provided. The processor $36_1$ is arranged to control the PHYs $38_1$ such that it is able to selectively enable or disable one or more of the channels 40 between the expander $34_1$ and the hub expander $34_3$. In fact, the control in this case is likely to be done from the root expander $34_3$ rather than the leaf expander. Its embedded processor $36_3$ will be able to control the lanes to all of the leaf expanders. Accordingly, although control could be done from the leaf level, it is referred that it is done from the root expander closer to the controller 32.

Since the capacity of the host CPU (not shown) is fixed, if the amount of host CPU capacity needed to perform the TOPS for expander $34_1$ is reduced, there is more of the capacity available for performing TOPS in respect of expanders $34_2$ and $34_4$. Hence, by use of software on the processor $36_1$ provided on expander $34_1$, tuneable performance with respect to the entire storage system is effectively enabled. This may be referred to as bandwidth shaping since the bandwidth profile across the storage system may be controlled.

The "hub" arrangement of the expanders in FIG. 3 is in no way limiting. In another example there is no "hub" expander. Instead, each of the branches of the tree connects directly to the controller. However, even with such an alternative configuration the same control can effectively be achieved by enabling (or disabling) the appropriate channels within each of the branches. What is important is the number of available channels or bandwidth between the controller and each set of the storage media.

In one example, the system 30 is arranged to provide tiered performance such that the drives connected to expander $34_1$ receive a different level of service from the drives connected to expanders $34_2$ and $34_4$. Hence, by the present method of controlling the number of paths between a hub expander (or more generally a controller 32) and the leaf expanders with respect to the disks in question, a method for providing distributed capabilities and tiered performance is enabled.

Furthermore, since each of expanders $34_1$ to $34_3$ includes its own processor 36, performance of the system as a whole is tuneable and controllable in an entirely flexible manner. Indeed, since the function of the processors $36_1$ to $36_4$ in controlling the PHYs $38_1$ to $38_4$ may be achieved via software running on processors $36_1$ to $36_4$ it is possible that the system could be built and assembled physically once and once only and then the performance can be changed by software updates without requiring any modification of the hardware (other than the software induced modification of the enabling and disabling of the PHYs).

In some cases, the system could actually be used in such a way that when originally provided to a user or customer, some of the PHYs can be disabled thus providing for the expander in question and the corresponding connected disk drives a reduced level of performance. The user would then be able to increase the performance by use of a software key or license which can be purchased and sold separately. Hence, an entirely flexible storage system is provided.

It will be appreciated that by reducing the lane count between certain expander pairs or expander and controller, the performance down a particular branch of the storage system can be correspondingly reduced. The same overall performance throttling for each and every one of expanders $34_1$, $34_2$ and $34_4$ can be achieved by reducing the lane count between the controller 32 and the hub expander $34_3$. When one of the lanes between a connected pair of expanders is turned off, this provides the benefit of more overall system bandwidth capability to other branches, thus a flexible tiered storage architecture can be implemented and controlled with slow storage devices having their performance turned down to match their bandwidth/IOPS capability allowing for faster devices such as solid state drives to have more of the overall system bandwidth.

Accordingly, whilst reducing the bandwidth between the expander and the controller has the effect of the IOPS performance of the interconnect between the controller and the expander being similarly reduced, and therefore an effect on all downstream expanders, the effect can also be used further down the tree structure by turning off one or more of the lanes between any pair of expanders. Thus, preferential bandwidth can be provided to some parts of the system while restricting others. Indeed, in a storage system including plural types of storage media the bandwidth provided to the different storage media can be applied in a corresponding manner. For example, when a storage system includes SSDs and rotating disks (e.g. hard disk drives), most bandwidth can be provided to SSDs rather than to the slower rotating disks. This can occur with in an enclosure and/or via externally cabled enclosures.

This arrangement can be provided either within a defined storage enclosure or via externally cabled enclosures. Indeed, the same performance management can be applied to external/expansion storage enclosures as well; both to the internal links and external cabled links. For systems that do not include expanders the same performance management can be applied to the controller PHYs by writing software that controls the state of the controller PHYs. Hence, using such techniques the storage system provided has a wide and flexible performance range. This will mean that in practice the same actual product can be provided into different storage markets or tiers by having the software limit the overall performance as required.

It will be appreciated, that one important feature of the present system is that it can be controlled at the expander/enclosure management level and is thus independent of any programs running on a host CPU. In this way, an enclosure manufacturer is able to protect operation of the host CPU and ensure that it is within thermal limits no matter what customer or end user application is running on the CPU. In other words, by determining the available bandwidth between the controller(s) and expanders in the system, it is possible to ensure that the host CPU is never exposed to conditions that could potentially cause damage to it.

Preferably, such controls are provided in cooperation with any applications running on the proposed CPU and this can be provided via vendor unique SCSI enclosure services (SES) pages.

The software that can be provided, in one embodiment, to run on an expander or enclosure CPU can be provided in any known format or program and such programming is within the knowledge of the skilled person.

Embodiments of the present disclosure have been described with particular reference to the examples illustrated. However, it will be appreciated that variations and modifications may be made to the examples described within the scope of the present disclosure.

What is claimed:

1. A storage system comprising:
   an expander coupled to a controller via multiple parallel data channel pathways; and
   a plurality of data storage devices coupled to the expander, the expander comprising a control circuit configured to selectively disable at least one but less than all of the multiple parallel data channel pathways to reduce an available bandwidth for communication between the data storage devices and a host processor coupled to the controller, the controller configured to execute input/output operations to transfer data to and read data from the data storage devices, the selective disabling of said at least one but less than all of the multiple parallel data channel pathways artificially throttling a total number of input/output operations that can be executed by the host processor.

2. The storage system of claim 1, further comprising the host processor coupled to the controller in communication with the plurality of data storage devices via the controller and the expander, the control circuit selectively disabling the at least one and less than all of the multiple parallel data channel pathways to reduce the overhead of the host processor dedicated to data transfers with the plurality of data storage devices and facilitate execution by the host processor of a software application configured to perform a RAID or de-duplication operation with the plurality of data storage devices.

3. The storage system of claim 1, the control circuit selectively disabling the at least one and less than all of the multiple parallel data channel pathways responsive to a sensed temperature measurement.

4. The storage system of claim 1, the control circuit selectively disabling the at least one and less than all of the multiple parallel data channel pathways responsive to an operational loading level of a host processor coupled to the controller.

5. The storage system of claim 1, the expander characterized as a serial attached small computer system interface ("SAS") expander.

6. The storage system of claim 1, the multiple parallel data channel pathways equal to four, wherein the control circuit of the expander reduces the total number of active pathways to one in a presence of a data transfer rate at the host processor greater than a maximum transfer rate of the active pathway.

7. The storage system of claim 1, the expander characterized as a first expander, the storage system further comprising second and third expanders coupled to the first expander, the plurality of storage devices comprising a first subset coupled to the second expander and a second subset coupled to the third expander.

8. The storage system of claim 7, the control circuit selectively disabling at least one and less than all of the multiple parallel data channel pathways to establish a first loading level for the first subset of storage devices and a different, second loading level for the second subset of storage devices.

9. The storage system of claim 7, the first subset of storage devices characterized as hard disc drives ("HDDs") and the second subset of storage devices characterized as solid-state drives ("SSDs").

10. The storage system of claim 1, the control circuit comprising an expander processor and associated programming in expander memory, the programming adapted to cause, upon execution, the disabling of the at least selected one and less than all of the parallel data channel pathways between the expander and the controller responsive to an input signal.

11. A storage system, comprising:
a host processor having a capacity to manage a maximum data transfer rate;
a controller coupled to the host processor;
a plurality of storage devices; and
a hub expander coupled between the storage devices and the controller, the hub expander connected to the controller using N parallel data channel pathways each having a pathway data transfer rate which, in total, equals or exceeds the maximum data transfer rate of the host processor, the expander comprising an expander processor having associated programming to operationally disable between 1 and N−1 of the parallel data channel pathways between the expander and the controller to artificially throttle the host processor to a reduced available transfer rate less than the maximum data transfer rate of the host processor responsive to an operational loading level of the host processor to free the host processor to perform overhead processing associated with the data storage devices in a presence of a rate of requested data transfers at the host processor greater than the reduced available data transfer rate, the host processor executing a storage application software routine associated with management of data stored by the storage devices in lieu of executing additional ones of the requested data transfers.

12. The storage system of claim 11, the expander processor operative to maintain the operational loading level of the host processor below a predetermined threshold comprising a total number of operations per second.

13. The storage system of claim 11, further comprising a temperature sensor proximate the host processor to provide a temperature measurement of an operational temperature of the host processor during data transfer operations between the host processor and the plurality of storage devices, the expander processor operative to maintain the operational temperature of the host processor below a predetermined threshold.

14. The storage system of claim 11, further comprising a first leaf expander coupled between the hub expander and a first subset of the plurality of storage devices and a second leaf expander coupled between the hub expander and a second subset of the plurality of storage devices, the expander processor further configured to disable at least one data channel pathway between the hub expander and a selected one of the first or second leaf expanders to further reduce an operational loading level of the host processor.

15. The storage system of claim 11, the plurality of storage devices characterized as hard disc drives ("HDDs") each having at least one rotatable magnetic recording disc.

16. A computer-implemented method comprising:
transferring data between a plurality of storage devices and a controller by way of an intervening expander therebetween, the expander connected to the controller by way of multiple parallel pathways;
monitoring an operational loading level of a host processor associated with the controller, the operational loading level indicative of a percentage of overhead of the host processor used to control data transfers with the storage devices; and
disabling at least one and less than all of the multiple parallel pathways to artificially throttle the monitored operational loading level of the host processor to a reduced level in the presence of a number of data transfer requests at the host processor corresponding to a level greater than the reduced level.

17. The method of claim 16, the monitored operational loading level reduced during the disabling step from an initial value of approximately 80% to a value of approximately 12%.

18. The method of claim 16, further comprising executing a software application by the host processor using a portion of overhead capacity of the host processor freed up by the disabling step, the software application stored in a memory and, when executed by the host processor, configured to carry out a RAID or de-duplication operation associated with the storage devices.

19. The method of claim 16, the disabling of at least one and less than all of the multiple parallel pathways carried out by programming instructions stored in a memory and executed by an expander processor of the expander responsive to the monitored operational loading level.

20. The method of claim 16, the expander comprising a first expander, a second expander connected to the first expander using second multiple parallel pathways, a third expander connected to the first expander using third multiple parallel pathways, a first subset of the plurality of storage devices coupled to the second expander, a second subset of the plurality of storage devices coupled to the third expander, the method further comprising disabling at least one and less than all of the second or third multiple parallel pathways to establish a relative operational loading ratio between the first and second subsets of storage devices.

* * * * *